United States Patent [19]

Lee

[11] 3,992,302

[45] Nov. 16, 1976

[54] DIALYZER BAFFLE

[75] Inventor: Kyu Ho Lee, Norristown, Pa.

[73] Assignee: Extracorporeal Medical Specialties, Inc., King of Prussia, Pa.

[22] Filed: Aug. 28, 1975

[21] Appl. No.: 608,444

[52] U.S. Cl. ............................ 210/321 B; 210/456; 210/494 M
[51] Int. Cl.² ......................................... B01D 31/00
[58] Field of Search ................. 210/456, 494, 321 B

[56] References Cited
UNITED STATES PATENTS 3,357,565   12/1967   Burger........................ 210/494 M X
3,712,474   1/1973   Martinez........................ 210/456 X Primary Examiner—Frank A. Spear, Jr.
Attorney, Agent, or Firm—Connolly and Hutz

[57] ABSTRACT

A baffle in a coil dialyzer is disclosed which encircles the upper portion of the outer layer of support material wrapped on the dialyzer core. This baffle prevents shunting of dialysate along the space between the dialyzer coil and outer dialyzer casing thereby materially improving dialyzer efficiency.

5 Claims, 3 Drawing Figures

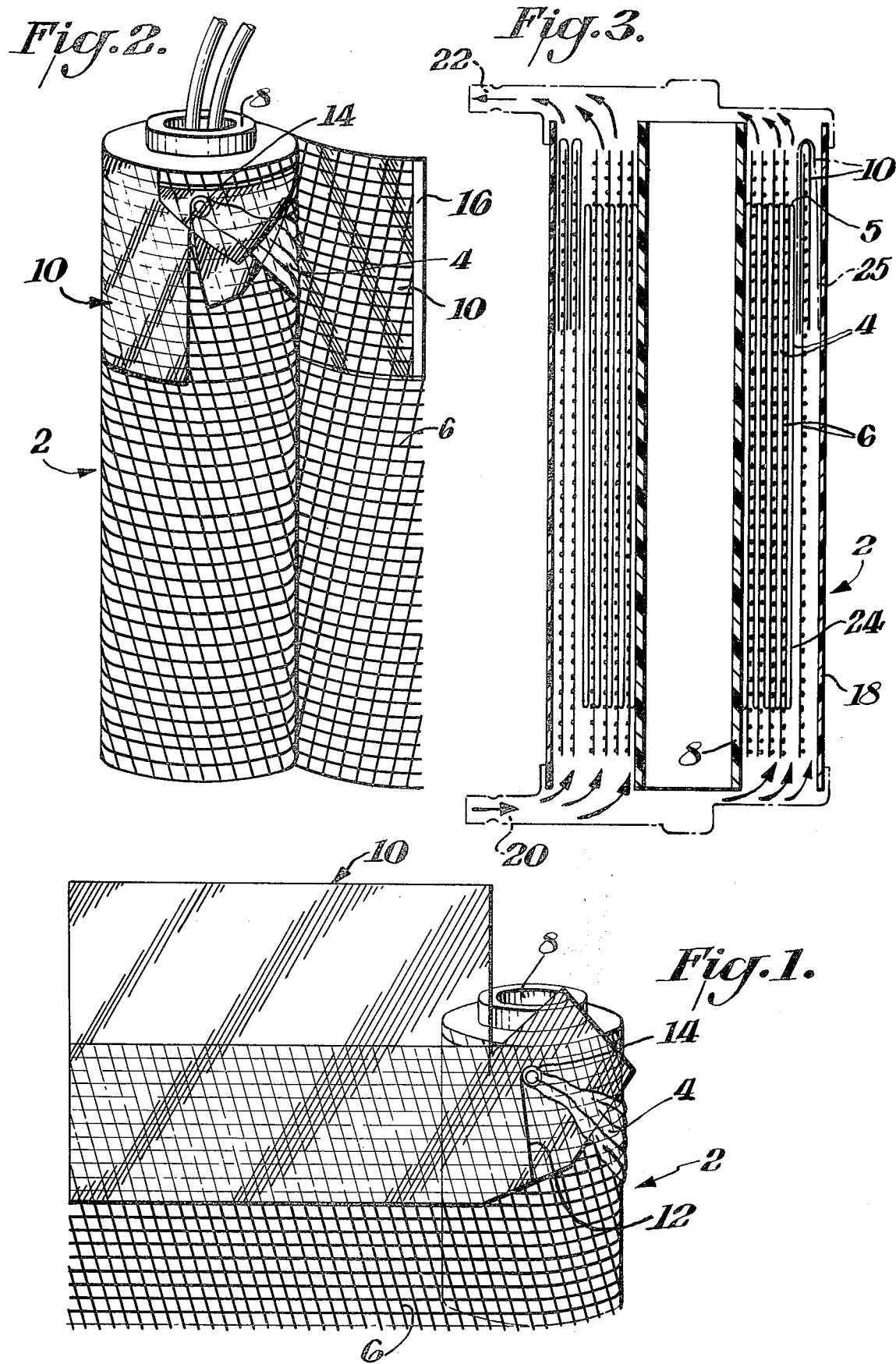

DIALYZER BAFFLE

BACKGROUND OF THE INVENTION

This invention relates to the field of separation in which different fluids are separated by a permeable membrane so that one or more components of one fluid will pass through the membrane to the other fluid, such as in dialysis and desalination. For purposes of illustration the disclosed and claimed invention related particularly to an artificial kidney system for treating human blood and more specifically to improvements in coil type dialyzers.

There are several kinds of commercial coil type dialyzers. However, their basic principle of operation and structure are similar. Coil type dialyzers are made of semi-permeable membrane tubing, such as Cuprophan, (a trademark of Enka Glenstaff, West Wuppertal, Germany, for regenerated cullulose dialysis tubing), wound around a hollow core along with a spacing or support material. This support material is usually made of a plastic mesh, netting or thin sheet with numerous surface irregularities on one side or both. This support material maintains a relatively uniform clearance between layers of membrane tubing wound around the core, and prevents the membrane tubing layers from contacting one another.

The core with the membrane tubing and support material spirally wound thereon is placed in a casing which has openings at the bottom for dialysate fluid inlet and openings at the top for dialysate fluid outlet. Generally, the fluid to be dialyzed (perfusate) enters through one end of the semi-permeable tubing flows through the inside of the tubing and exits the other end of the membrane tubing. On the other hand, dialysate fluid flows between and around the outside of the membrane tubing and continuously removes permeating solutes. These solutes come from the perfusate by dialysis across the semi-permeable membrane wall. Continuous dialysis is achieved by maintaining a concentration gradient across the membrane. This gradient is achieved by the continuous flow of dialysate over the outside of the membrane wall.

In order to obtain maximum efficiency from a given coil dialyzer under given flow conditions through the casing it is necessary to prevent any shunting or bypass of the dialysate fluid around the permeable tubing. However, most coil type dialyzers have a substantial amount of space between the last outside layer of membrane tubing and the casing wall where such shunting occurs. This is because there is usually one or more layers of support material on top of the last permeable membrane layer which provide a path of reduced flow resistance to the incoming dialysate.

Shunting of dialysate through these layers of support material causes a decrease in the efficiency of the dialyzer. In coil type artificial kidneys, the portions of the dialysate fluid flowing through these layers increases with time up to a certin maximum value.

SUMMARY OF THE INVENTION

It was found that bypass of the major portion of the dialysate fluid which flows through the space between the dialyzer casing wall and the last layer of membrane tubing can be effectively prevented by a simple baffle of the type disclosed herein. This baffle is made of a soft, relatively non-porous sheet of natural or synthetic materials. The baffle is placed at the top or outlet side of the dialyzer coil in such a manner that it blocks the flow of dialysate in the space between the last layer of permeable membrane tubing and the casing and diverts that flow into contact with the tubing. The only requirements of the baffle are that it be insoluble in water and be of sufficient pliability to be easily wrapped around the coil.

BRIEF DESCRIPTION OF THE DRAWINGS

Numerous advantages of the present invention will become apparent to one skilled in the art from a reading of the detailed description in conjunction with accompanying drawings wherein similar reference characters refer to similar parts and in which:

FIG. 1 is an illustration of a dialyzer coil with the baffle of this invention in position prior to final assembly of the coil;

FIG. 2 illustrates the baffle of this invention in place after final assembly of the dialyzer coil;

FIG. 3 is a cross sectional view through the middle of the dialyzer coil showing the baffle of this invention in place between the dialyzer casing wall and the last layer of membrane tubing on the dialyzer coil.

DETAILED DESCRIPTION OF THE DRAWINGS

Referring in more particularity to the drawings there is illustrated an improved dialyzer coil 2 which in conventional fashion involves the coiling in spiral fashion of permeable membrane tubing 4 and support material 6 around a core 8 (FIG. 1). The unique baffle 10 of this invention comprises a sheet of flexible, foldable, biocompatible material which is of a length equal to or greater than the circumference of the dialyzer coil 2. The baffle 10 in its unfolded state is preferable inserted between the last layer of support material 6 and membrane tubing 4 as that material is being wound around the core 8 (FIG. 1). To facilitate placement and retention of the baffle 10 one end thereof may be slit 12 to fit over the permeable tubing outlet 14.

After placement, the baffle sheet 10 is folded over on itself so that approximately one half its height is on the inside and the other half on the outside of the outer layer of support material 6. The end 16 of baffle 10 after being folded upon itself can be sealed to aid in the avoidance of dialysate bypass. The outer portion of baffle 10 after being folded should extend far enough down along the outside of the coil 2 so that it overlaps the upper edge 5 of membrane tubing 4.

After the assembly of the dialyzer coil 2 with baffle 10 in place it is inserted in a casing 18 (FIG. 3) which has a dialysate inlet 20 and outlet 22. The portion of incoming dialysate fluid which normally tends to flow into the space between the inner wall of dialyzer casing 18 and the last permeable membrane layer 24 now will flow into the underside of folded baffle 10 and expand the baffle against the inner wall of casing 18 and membrane layer 24 (as shown by phantomed line 25). This expanded baffle 10 effectively prevents the dialysate fluid from flowing through this space between the casing 18 and the last membrane layer 24 and forces it to flow internally between layers of membrane tubing 4. This markedly increases dialyzer efficiency.

EXAMPLE 1

Ten single pass type artificial kidneys, 10 without baffles and 10 with baffles, were made and in vitro clearances of urea, creatinime, $Cl^-$ ion, and vitamin $B_{12}$ were measured at 37° C. The experimental conditions were perfusate flow rate 300 ml/min and dialysate flow rate 500 ml/min. The average values of performances of each group of dialyzers are given In Table I.

TABLE I

Average Values of In Vitro Clearances of Ten Coil Type Artificial Kidneys With and Without Film Baffles

| Solutes | Molecular Weight | Clearance Without Film Baffle, ml/min | Clearance With Film Baffle, ml/min | % Increase |
|---|---|---|---|---|
| Chloride | 35 | 143.2 ± 10.0 | 162.1 ± 10.4 | 12.4% |
| Urea | 60 | 131.6 ± 9.9 | 156.7 ± 7.0 | 17.4% |
| Creatinime | 113 | 101.1 ± 5.9 | 121.4 ± 8.5 | 18.2% |
| Vitamin $B_{12}$ | 1355 | 28.2 ± 3.1 | 42.4 ± 4.1 | 40.2% |

As is clearly shown in Example 1 the artificial kidneys with baffle 10 perform much better than those without the baffle.

I claim:

1. In a coil dialyzer comprising an outer casing an inner core, means for passing dialysate between said casing and core, permeable membrane tubing spirally wound on said core the outer periphery thereof spaced from the outer casing, support material spirally wound on said core with said tubing and extending beyond the outer periphery of said tubing into the space between said tubing and the casing, a baffle overlying the support material in said space between the casing and tubing to prevent shunting of dialysate through this space.

2. The coil dialyzer of claim 1 wherein the baffle comprises a fluid impervious, flexible sheet of biocompatible material one portion of which is located adjacent the outer layer of permeable tubing and the other portion folded over the upper edge of the outer layer of support material.

3. The coil dialyzer of claim 2 wherein at least one edge of the baffle sheet which is folded over on itself is sealed.

4. The coil dialyzer of claim 2 wherein the outer fold of the baffle sheet extends below the upper edge of the permeable tubing.

5. The coil dialyzer of claim 2 wherein the length of the baffle sheet is equal to or greater than the circumference of the permeable tubing and support material wound on the core.

* * * * *